US012676707B2

(12) United States Patent (10) Patent No.: US 12,676,707 B2
Xiong et al. (45) Date of Patent: Jul. 7, 2026

(54) METHOD AND DEVICE FOR TRANSMITTING AND/OR RECEIVING SIGNALS FOR POSITIONING

(71) Applicant: Samsung Electronics Co., Ltd., Gyeonggi-do (KR)

(72) Inventors: Qi Xiong, Beijing (CN); Feifei Sun, Beijing (CN)

(73) Assignee: Samsung Electronics Co., Ltd. (KR)

( * ) Notice: Subject to any disclaimer, the term of this patent is extended or adjusted under 35 U.S.C. 154(b) by 81 days.

(21) Appl. No.: 18/501,144

(22) Filed: Nov. 3, 2023

(65) Prior Publication Data

US 2024/0154742 A1 May 9, 2024

(30) Foreign Application Priority Data

Nov. 4, 2022 (CN) .......................... 202211380032.X

(51) Int. Cl.
*H04L 5/00* (2006.01)
*H04W 72/044* (2023.01)
(52) U.S. Cl.
CPC ......... *H04L 5/0012* (2013.01); *H04W 72/044* (2013.01)
(58) Field of Classification Search
CPC ....... H04L 5/0012; H04L 5/001; H04L 5/005; H04L 5/0053; H04L 5/0094; H04W 72/044; H04W 24/02; H04B 1/7136; H04B 1/7143
See application file for complete search history.

(56) References Cited

U.S. PATENT DOCUMENTS

| | | | | |
|---|---|---|---|---|
| 2020/0022127 A1* | 1/2020 | Li | | H04W 72/20 |
| 2020/0204327 A1* | 6/2020 | Jia | | H04W 72/0453 |
| 2020/0213161 A1* | 7/2020 | Zhang | | H04W 80/08 |
| 2020/0235877 A1* | 7/2020 | Manolakos | | H04W 4/70 |
| 2021/0392609 A1* | 12/2021 | Siomina | | H04W 64/00 |
| 2022/0109466 A1* | 4/2022 | Manolakos | | H04B 1/713 |

(Continued)

FOREIGN PATENT DOCUMENTS

CN 101730135 B * 8/2013 ............ H04W 24/10

OTHER PUBLICATIONS

Moderator (Ericsson), "Feature Lead Summary #3 for Positioning for RedCap UEs", R1-2210476, 3GPP TSG RAN WG1 #110bis-e, Oct. 10-19, 2022, 57 pages.

(Continued)

*Primary Examiner* — Liem H. Nguyen
(74) *Attorney, Agent, or Firm* — The Farrell Law Firm, P.C.

(57) ABSTRACT

The disclosure relates to a 5G or 6G communication system for supporting a higher data transmission rate. A method performed by a UE in a wireless communication system is provided. The method includes receiving configuration information for a positioning signal, wherein the configuration information includes at least one of time domain information or frequency domain information related to frequency hopping, and wherein the frequency domain information includes at least one of information related to a frequency hopping BWP or information related to a frequency hopping RB; and transmitting the positioning signal based on the configuration information.

20 Claims, 9 Drawing Sheets

400

(56)      References Cited

U.S. PATENT DOCUMENTS

| | | | |
|---|---|---|---|
| 2023/0090394 A1* | 3/2023 | Sharma | H04L 5/0012 |
| | | | 370/329 |
| 2023/0115192 A1* | 4/2023 | Nemeth | H04W 56/002 |
| | | | 370/329 |
| 2024/0259853 A1* | 8/2024 | El Hamss | G01S 5/0236 |
| 2024/0372668 A1* | 11/2024 | Zhang | H04L 5/00 |
| 2025/0030511 A1* | 1/2025 | Jiang | H04L 5/0048 |
| 2025/0096959 A1* | 3/2025 | Sakhnini | H04L 5/0007 |
| 2025/0175210 A1* | 5/2025 | Wang | H04B 1/713 |
| 2025/0311049 A1* | 10/2025 | Lin | H04W 52/0235 |
| 2026/0046808 A1* | 2/2026 | Rao | H04W 64/00 |

OTHER PUBLICATIONS

Moderator (Sharp), "FL Summary #3 on Enhancements on PUSCH Repetition Type A", R1-2108462, 3GPP TSG-RAN WG1 #106-e, Aug. 16-27, 2021, 70 pages.

Vivo, "Discussion on Positioning for RedCap UEs", R1-2208652, 3GPP TSG RAN WG1 #110bis-e, Oct. 10-19, 2022, 18 pages.

Huawei, HiSilicon, "Discussion on RedCap Positioning", R1-2208457, 3GPP TSG-RAN WG1 Meeting #110bis-e, Oct. 10-19, 2022, 14 pages.

Nokia, Nokia Shanghai Bell, "Views on Positioning for RedCap UEs", R1-2208738, 3GPP TSG RAN WG1 #110-bis, Oct. 10-19, 2022, 6 pages.

International Search Report dated Feb. 8, 2024 issued in counterpart application No. PCT/KR2023/017407, 6 pages.

\* cited by examiner

Figure 4:
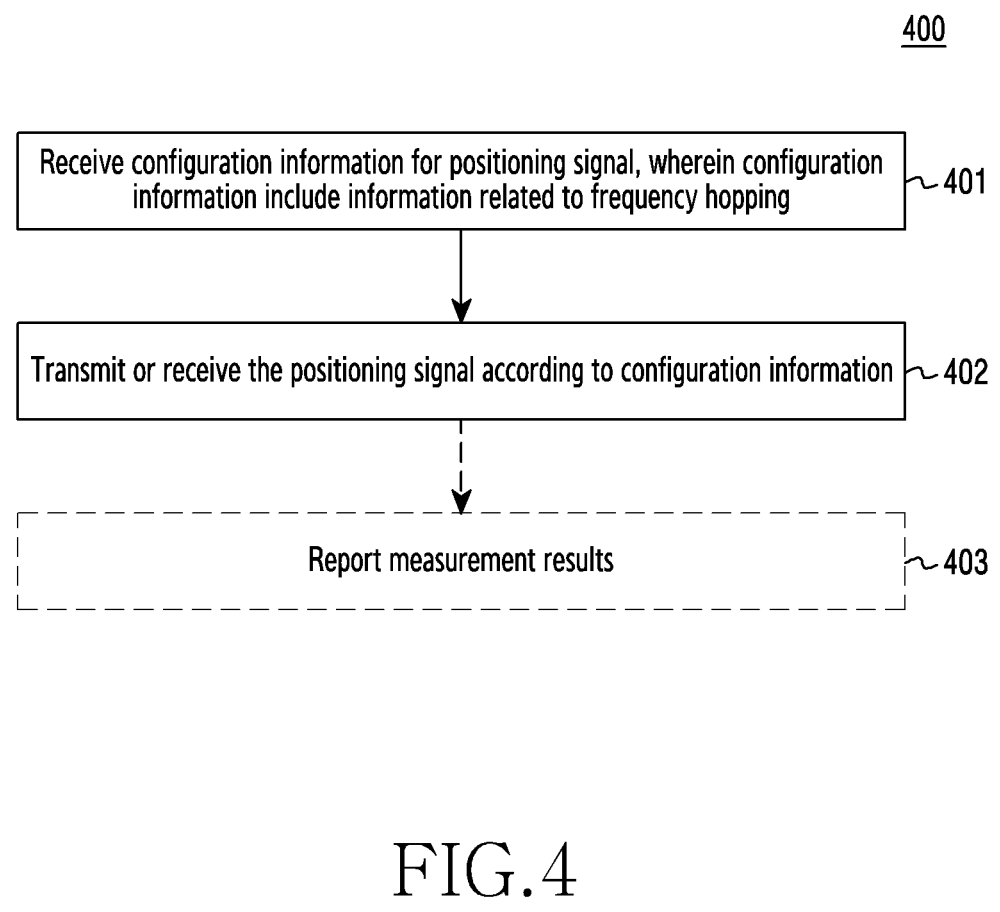

400

Receive configuration information for positioning signal, wherein configuration information include information related to frequency hopping ∽401

Transmit or receive the positioning signal according to configuration information ∽402

Report measurement results ∽403

| Transceiver 701 | Memory 702 | Processor 703 |

METHOD AND DEVICE FOR TRANSMITTING AND/OR RECEIVING SIGNALS FOR POSITIONING

CROSS-REFERENCE TO RELATED APPLICATION(S)

This application is based on and claims priority under 35 U.S.C. § 119(a) to Chinese Patent Application No. 202211380032.X, which was filed with the China National Intellectual Property Administration on Nov. 4, 2022, the entire disclosure of which is incorporated herein by reference.

BACKGROUND

1. Field

The disclosure relates generally to a wireless communication system, and more specifically, to a method and a device for transmitting and/or receiving signals for positioning in a wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional multiple-input multiple-output (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

In accordance with an aspect of the disclosure, a method performed by a UE in a wireless communication system is provided. The method includes receiving configuration information for a positioning signal, wherein the configuration information includes at least one of time domain information or frequency domain information related to frequency hopping, and wherein the frequency domain information includes at least one of information related to a frequency hopping BWP or information related to a frequency hopping resource block (RB); and transmitting the positioning signal based on the configuration information.

In accordance with an aspect of the disclosure, a UE is provided for use in a wireless communication system. The UE includes a transceiver and a controller coupled with the transceiver and configured to receive configuration information for a positioning signal, wherein the configuration information includes at least one of time domain information or frequency domain information related to frequency hopping, and wherein the frequency domain information includes at least one of information related to a frequency hopping BWP or information related to a frequency hopping RB, and transmit the positioning signal based on the configuration information.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating a method according to an embodiment;

DETAILED DESCRIPTION

Figure 1:
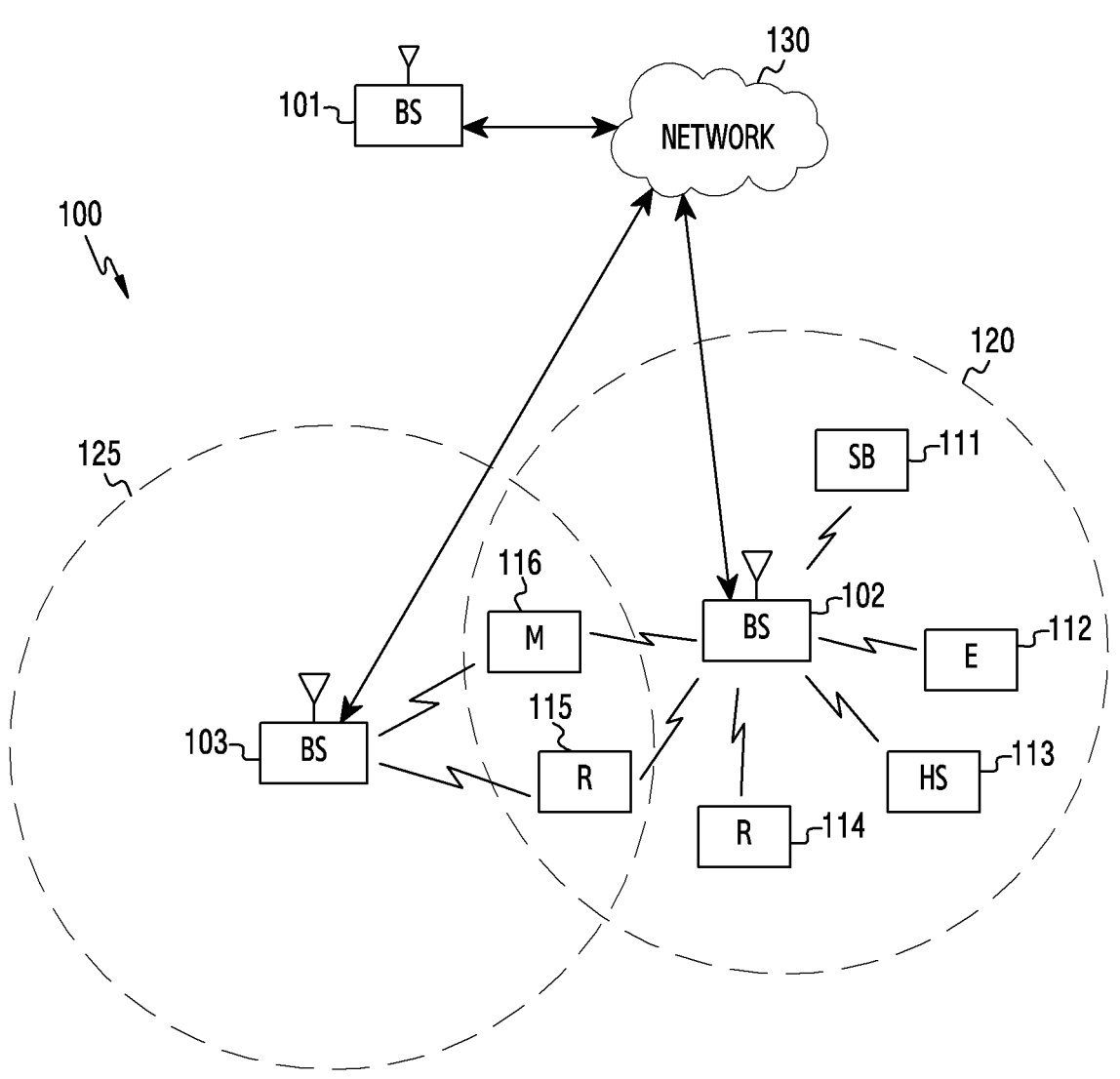
FIG. 1 illustrates a wireless network according to an embodiment.

The following description with reference to the accompanying drawings is provided to facilitate a comprehensive understanding of various embodiments of the present disclosure as defined by the claims and their equivalents. This description includes various specific details to facilitate understanding but should only be considered as exemplary. Therefore, those skilled in the art will recognize that various changes and modifications may be made to the various embodiments described herein without departing from the scope and spirit of the present disclosure. In addition, for the sake of clarity and conciseness, descriptions of well-known functions and structures may be omitted.

The terms and expressions used in the following specification and claims are not limited to their dictionary meanings, but are only used herein to enable a clear and consistent understanding of the present disclosure. Therefore, those skilled in the art will appreciate that the following descriptions of various embodiments of the present disclosure are provided for illustration purposes only and are not intended to limit the purposes of the present disclosure as defined in the appended claims and their equivalents.

Herein, singular forms of "a", "an", and "the" include plural referents unless otherwise indicated by the context clearly. Thus, e.g., a reference to a "component surface" includes a reference to one or more such surfaces.

The terms "include" or "may include" refer to the existence of a corresponding disclosed function, operation or component that can be used in various embodiments of the present disclosure, and do not limit the existence of one or more additional functions, operations or features. In addition, the terms "including" or "having" may be interpreted as indicating certain characteristics, numbers, steps, operations, constituent elements, components or combinations thereof, but should not be interpreted as excluding the possibility of the existence of one or more other characteristics, numbers, steps, operations, constituent elements, components or combinations thereof.

The term "or" includes any of the listed terms and all combinations thereof. For example, "A or B" may include A, may include B, or may include both A and B.

When an element is described as being "connected or "coupled" to another element, it may be directly connected or coupled to the other element, or intervening elements may also exist. Furthermore, "connected" or "coupled" as used herein may include wireless connection or wireless coupling.

As used herein, the phrase "and/or" includes all or any unit and all combinations of one or more associated listed items.

Herein, a UE, terminal, or terminal device includes both a device of wireless signal receiver, which only has a device of wireless signal receiver without transmission capability, and a device of receiving and transmitting hardware, which has a device of receiving and transmitting hardware capable of two-way communication on a two-way communication link. Such devices may include a cellular or other communication device having a single-line display or a multi-line display or a cellular or other communication device without a multi-line display; a personal communications service (PCS), which can combine voice, data processing, fax and/or data communication capabilities; a personal digital assistant (PDA), which may include a radio frequency (RF) receiver, a pager, an Internet/Intranet access, a web browser, a notepad, a calendar, and/or a global positioning system (GPS) receiver; a conventional laptop and/or palmtop computer or other device having and/or including a radio frequency receiver.

A UE, terminal, or terminal device may be portable, transportable, installed in vehicles (air, sea and/or land), or suitable and/or configured to operate locally, and/or operate in any other position on the earth and/or space in a distributed form. A UE, terminal, or terminal device may also be communication terminals, internet terminals and music/video playing terminals, such as PDA, a mobile Internet device, and/or mobile phone with music/video playing function, as well as smart television (TV), set-top box, and/or other devices.

Herein, the term "send" can be used interchangeably with "transmit", "report", and "notify".

Unless defined differently, all terms (including technical terms or scientific terms) used in this disclosure have the same meaning as those understood by those skilled in the art in this disclosure. Common terms, as defined in dictionaries, are interpreted as having meanings consistent with the context in the relevant technical fields, and should not be interpreted in an idealized or overly formal way unless explicitly defined in this disclosure.

A technical scheme of an embodiment of the disclosure may be applied to various communication systems, such as a global system for mobile communications (GSM) system, a code division multiple access (CDMA) system, a wideband CDMA (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5G system, an NR system, etc. In addition, a technical scheme of an embodiment of the disclosure can be applied to future-oriented communication technologies.

In order to meet the increasing demand for wireless data communication services since the deployment of 4th generation (4G) communication systems, efforts have been made to develop improved 5G or pre-5G communication systems. 5G or pre-5G communication systems may also be referred to as "beyond 4G networks" or "post-LTE systems".

In order to achieve a higher data rate, 5G communication systems are implemented in higher frequency (e.g., mmWave) bands, e.g., 60 GHz bands.

In order to reduce propagation loss of radio waves and increase a transmission distance, technologies such as beamforming, massive MIMO, FD-MIMO, array antennas, analog beamforming, and large-scale antennas are being discussed for use in 5G communication systems.

In addition, in 5G communication systems, development of system network improvements are underway based on advanced small cell, cloud radio access network (RAN), an ultra-dense network, device-to-device (D2D) communication, wireless backhaul, mobile network, cooperative communication, coordinated multi-points (CoMP), reception-end interference cancellation, etc.

In 5G systems, a hybrid frequency-shift keying (FSK) and quadrature amplitude modulation (QAM) modulation (FQAM) and sliding window superposition coding (SWSC) have been developed for advanced coding modulation (ACM), and a filter bank multicarrier (FBMC), non-orthogonal multiple access (NOMA), and sparse code multiple access (SCMA) have been developed as advanced access technologies.

According to an embodiment of the present disclosure, a method is provided for a UE, which includes receiving configuration information for a positioning signal, wherein the configuration information includes at least one of time domain information or frequency domain information related to frequency hopping, and wherein the frequency domain information includes at least one of information related to a frequency hopping bandwidth part BWP and information related to a frequency hopping RB; and transmitting or receiving the positioning signal according to the configuration information.

The information related to frequency hopping includes at least one of information related to a frequency domain location of the frequency hopping, information on a number of frequency hoppings, time domain gap information of the frequency hopping, a threshold for time domain gap between the frequency hopping, and information related to a frequency hopping type.

The information related to frequency hopping BWP includes a frequency hopping BWP index or index set, and the information related to the frequency hopping RB includes a frequency hopping RB set index.

The time domain gap information of frequency hopping includes a number of time units between adjacent frequency hopping.

If the number of time domain units between adjacent frequency hopping is not less than a threshold for a time domain gap between frequency hopping, then the frequency domain locations of adjacent frequency hopping overlap or are the same. If the number of time domain units between adjacent frequency hopping is less than the threshold for time domain gap between frequency hopping, then the frequency domain locations of frequency hopping do not overlap.

The frequency hopping type indication information indicates an intra time period frequency hopping or an inter time period frequency hopping.

The positioning signal includes all positioning signals within a time period, one of the positioning signals, a plurality of the positioning signals, all repetitions of all of the positioning signals, or a frequency hopping of a positioning signal among the positioning signals.

The time period includes a time unit, a configuration period, a measurement period, a measurement gap, a measurement window, or a positioning signal processing window.

The UE receives or transmits positioning signals according to the frequency domain information sequentially in time domain.

If the positioning signal conflicts or overlaps with other signal transmissions, then the frequency hopping of the positioning signal is cancelled.

The method further comprises measuring the positioning signal, wherein the measurement result is the measurement result of a single frequency hopping or the measurement results of M frequency hopping, wherein M is configured by a network device, or M is determined based on the number of frequency hopping actually transmitted or received or the number of frequency hopping in the time period for the positioning signal.

If the gap between adjacent frequency hopping is less than a second threshold, then the transmission or reception of the positioning signal on the latter of the adjacent frequency hopping is cancelled.

According to an embodiment, a UE is provided, which includes a transceiver and a processor, coupled with the transceiver and configured to perform any of the methods according to the embodiments of the present disclosure.

Embodiments of the disclosure provide a method performed by a UE, e.g., a UE with limited bandwidth transmission/reception capability, to transmit/receive positioning signals with large bandwidth by processing or configuring positioning signals in the time domain/frequency domain.

FIG. 1 illustrates a wireless network 100 according to an embodiment. The embodiment of the wireless network 100 shown in FIG. 1 is for illustration only. Other embodiments of the wireless network 100 can be used without departing from the scope of the present disclosure.

Referring to FIG. 1, the wireless network 100 includes a gNodeB (gNB) 101, a gNB 102, and a gNB 103. The gNB 101 communicates with the gNBs 102 and 103. The gNB 101 also communicates with at least one Internet protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used herein to refer to network infrastructure components that provide wireless access for remote terminals. Depending on the type of the network, other well-known terms such as "mobile station", "user station", "remote terminal", "wireless terminal" or "user apparatus" can be used instead of "user equipment" or "UE". For convenience, the terms "user equipment" and "UE" are used herein to refer to remote wireless devices that wirelessly access a gNB, regardless of whether the UE is a mobile device (such as a mobile phone or a smart phone) or a fixed device (such as a desktop computer or a vending machine).

The gNB 102 provides wireless broadband access to a network 130 for a first plurality of UEs 111 to 116 within a coverage area 120 of the gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cellular phone, a wireless laptop computer, a wireless PDA, etc.

The gNB 103 provides wireless broadband access to the network 130 for a second plurality of UEs 115 and 116 within a coverage area 125 of the gNB 103. The second plurality of UEs include the UEs 115 and 116.

In some embodiments, one or more of the gNBs 101-103 can communicate with each other and with the UEs 111-116 using 5G, LTE, LTE advanced (LTE-A), WiMAX, or other advanced wireless communication technologies.

The dashed lines in FIG. 1 represent approximate ranges of the coverage areas 120 and 125, and the ranges are shown as approximate circles merely for illustration and explanation purposes. The coverage areas 120 and 125 may have other shapes, including irregular shapes, depending on configurations of the gNBs 102 and 103 and changes in the radio environment associated with natural obstacles and man-made obstacles.

As will be described in more detail below, one or more of the gNBs 101, 102, and 103 may include a 2-dimensional (2D) antenna array. In some embodiments, one or more of the gNBs 101, 102, and 103 may support codebook designs and structures for systems with 2D antenna arrays.

Although FIG. 1 illustrates an example of the wireless network, various changes can be made to FIG. 1. For example, the wireless network can include any number of gNBs and any number of UEs in any suitable arrangement. Further, the gNB 101 can directly communicate with any number of UEs and provide wireless broadband access to the network 130 for those UEs. Similarly, each of gNBs 102 and 103 can directly communicate with the network 130 and provide direct wireless broadband access to the network 130 for the UEs. In addition, the gNBs 101, 102, and/or 103 can provide access to other or additional external networks, such as external telephone networks or other types of data networks.

Figure 2A:
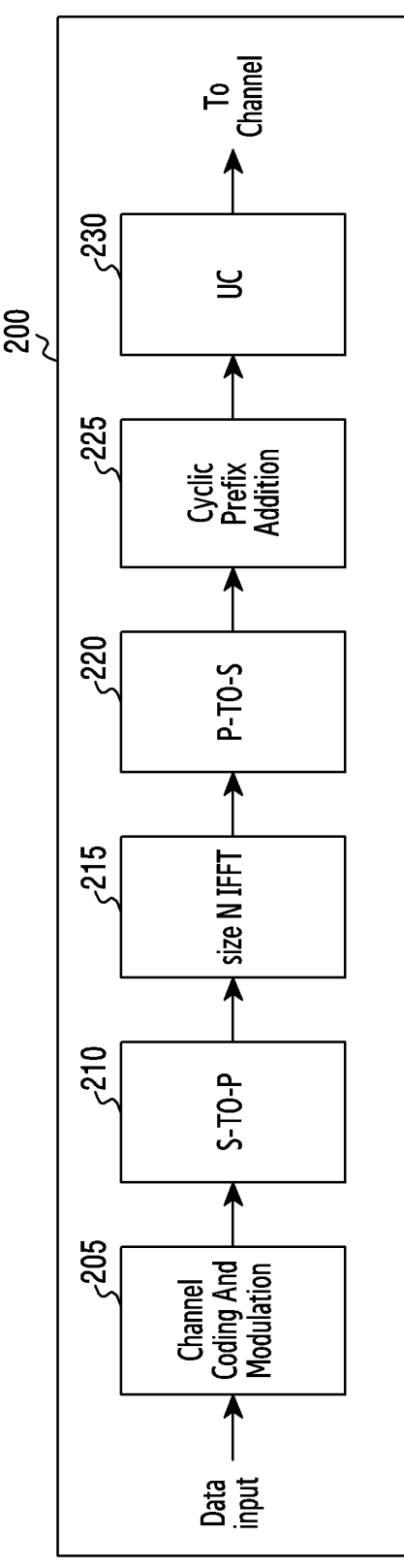
FIG. 2A illustrates a wireless transmission path according to an embodiment.
Figure 2B:
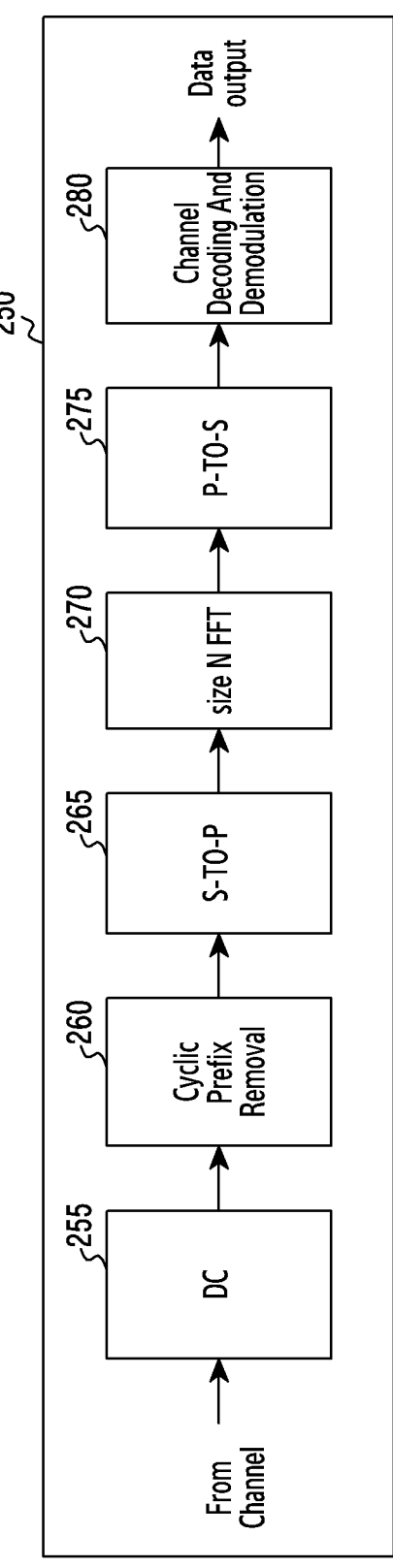
FIG. 2B illustrates a wireless reception path according to an embodiment.

FIGS. 2A and 2B illustrate wireless transmission and reception paths according to an embodiment.

In FIG. 2A, a transmission path 200 can be described as being implemented in a gNB, such as the gNB 102, and in FIG. 2B, the reception path 250 can be described as being implemented in a UE, such as the UE 116. However, the reception path 250 can be implemented in any gNB and the transmission path 200 can be implemented in any UE.

In some embodiments, the reception path 250 is configured to support codebook designs and structures for systems with 2D antenna arrays.

Referring to FIG. 2A, the transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230.

In the transmission path 200, the channel coding and modulation block 205 receives a set of information bits, applies coding (such as LDPC coding), and modulates the input bits (such as using quadrature phase shift keying (QPSK) or QAM) to generate a sequence of frequency-domain modulated symbols. The S-to-P block 210 converts (e.g., demultiplexes) serial modulated symbols into parallel data to generate N parallel symbol streams, where N is a size of the IFFT/fast Fourier transform (FFT) used in the gNB 102 and the UE 116. The size N IFFT block 215 performs IFFT operations on the N parallel symbol streams to generate a time-domain output signal. The P-to-S block 220 converts (e.g., multiplexes) parallel time-domain output symbols from the Size N IFFT block 215 to generate a serial time-domain signal. The cyclic prefix addition block 225 inserts a cyclic prefix into the time-domain signal. The UC 230 modulates (e.g., up-converts) the output of the cyclic prefix addition block 225 to an RF for transmission via a wireless channel. The signal can also be filtered at a baseband before switching to the RF frequency.

Referring to FIG. 2B, the reception path 250 includes a down-converter (DC) 255, a cyclic prefix removal block 260, an S-to-P block 265, a size N FFT block 270, a P-to-S block 275, and a channel decoding and demodulation block 280.

The RF signal transmitted from the gNB 102 arrives at the UE 116 after passing through the wireless channel, and operations in reverse to those at the gNB 102 are performed at the UE 116. More specifically, the DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The Size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of the gNBs 101-103 may implement a transmission path 200 similar to that for transmitting to the UEs 111-116 in the downlink, and may implement a reception path 250 similar to that for receiving from the UEs 111-116 in the uplink. Similarly, each of the UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B may be implemented using hardware, or using a combination of hardware and software/firmware. For example, at least some of the components in FIGS. 2A and 2B may be implemented in software, while other components may be implemented in configurable hardware or a combination of software and configurable hardware. For example, the FFT block 270 and the IFFT block 215 may be implemented as configurable software algorithms, in which the value of the size N may be modified according to the implementation.

Furthermore, although FIGS. 2A and 2B are described as using FFT and IFFT, this is only illustrative and should not be interpreted as limiting the scope of the disclosure. Other types of transforms can be used, such as discrete Fourier transform (DFT) and inverse DFT (IDFT) functions. For DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
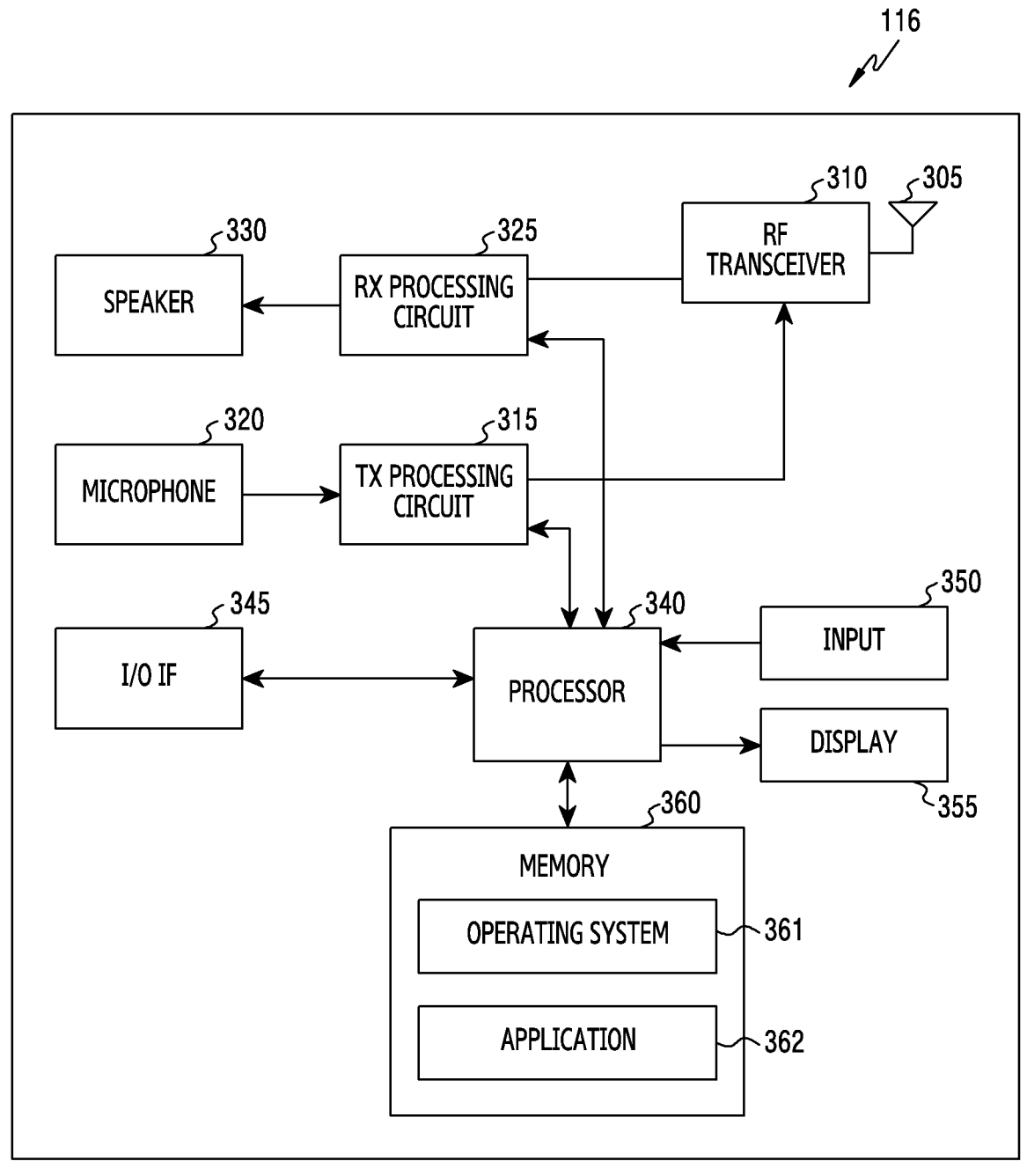
FIG. 3A illustrates a UE according to an embodiment.

FIG. 3A illustrates a UE according to an embodiment. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

Referring to FIG. 3A, the UE 116 includes an antenna 305, an RF transceiver 310, a transmission (TX) processing circuit 315, a microphone 320, and a reception (RX) processing circuit 325. The UE 116 also includes a speaker 330, a processor/controller 340, an input/output (I/O) interface 345, an input device 350, a display 355, and a memory 360. The memory 360 stores an operating system (OS) 361 and one or more applications 362.

The RF transceiver 310 receives an incoming RF signal transmitted by a gNB of the wireless network from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 may transmit the processed baseband signal to the speaker 330 (e.g., for voice data) or to processor/controller 340 for further processing (e.g., for web browsing data).

The TX processing circuit 315 receives analog or digital voice data from the microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the UE. For example, the processor/controller 340 can control the reception of forward channel signals and the transmission of backward channel signals through the RF transceiver 310, the RX processing circuit 325, and the TX processing circuit 315. In some embodiments, the processor/controller 340 includes at least one microprocessor or microcontroller.

The processor/controller 340 may execute other processes and programs residing in the memory 360, such as operations for channel quality measurement and reporting for systems with 2D antenna arrays. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device 350 and the display 355. An operator of the UE can input data into UE 116 using the input device 350. The display 355 may be a liquid crystal display (LCD) or other display capable of presenting text and/or at least limited graphics (e.g., from a website).

The memory 360 is coupled to the processor/controller 340. A part of the memory 360 can include a random access memory (RAM), while another part of the memory 360 can include a flash memory or other read-only memory (ROM).

Various changes can also be made to FIG. 3A. For example, various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Furthermore, although FIG. 3A illustrates that the UE is configured as a mobile phone or a smart phone, the UE can be configured to operate as other types of mobile or fixed devices.

Figure 3B:
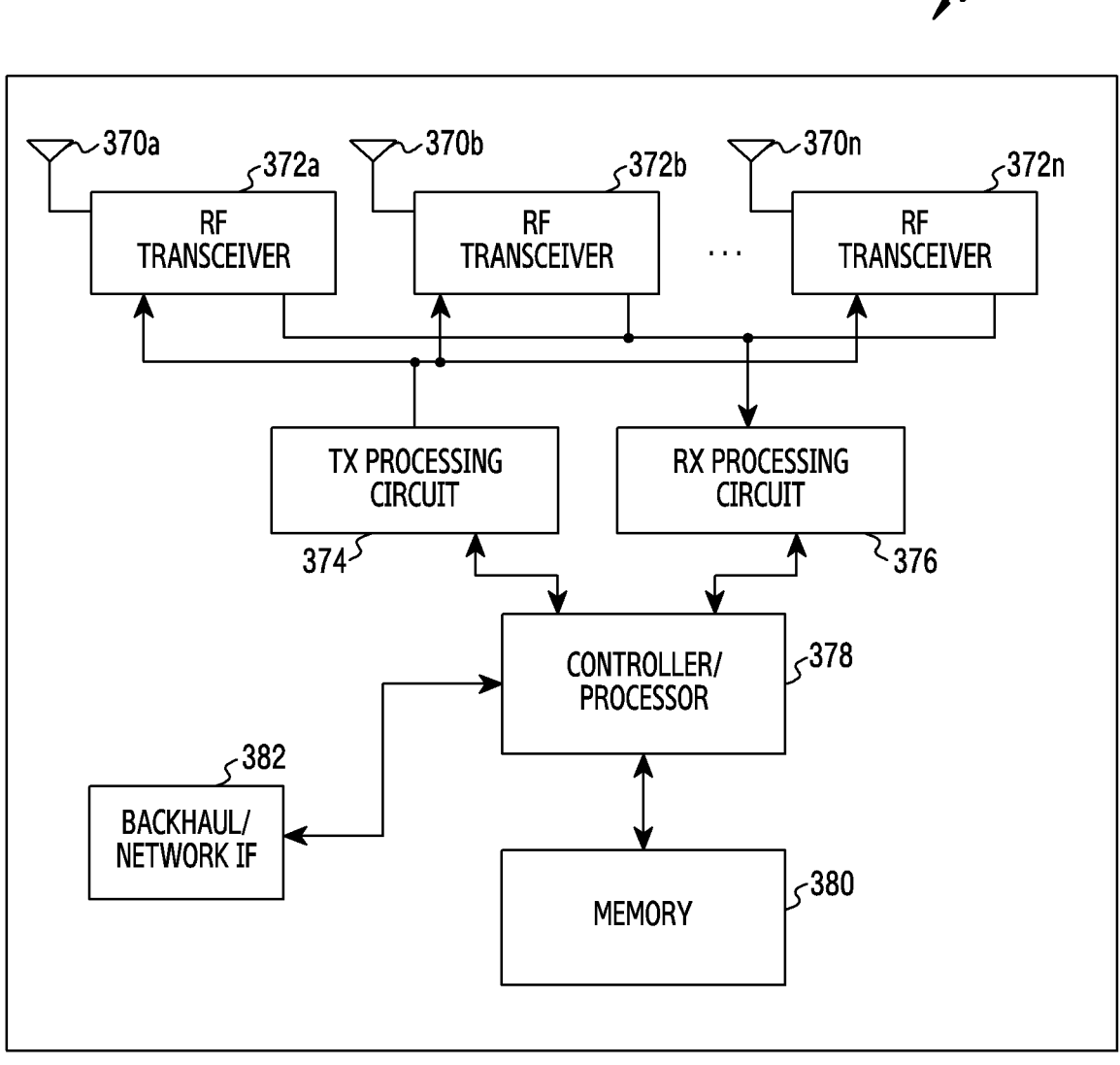
FIG. 3B illustrates a base station according to an embodiment.

FIG. 3B illustrates a gNB 102 according to an embodiment. The embodiment of gNB 102 shown in FIG. 3B is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

Referring to FIG. 3B, the gNB 102 includes a plurality of antennas 370a-370n, a plurality of RF transceivers 372a-372n, a TX processing circuit 374, and an RX processing circuit 376. In certain embodiments, one or more of the plurality of antennas 370a-370n may include a 2D antenna array. The gNB 102 also includes a controller/processor 378, a memory 380, and a backhaul or network interface 382.

The RF transceivers 372a-372n receive an incoming RF signal from the antennas 370a-370n, such as a signal transmitted by UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (e.g., voice data, network data, email or interactive video game data) from the controller/processor 378. The TX processing circuit 374 encodes, multiplexes, and/or digitizes outgoing baseband data to generate a processed baseband or IF signal.

The RF transceivers 372a-372n receive the outgoing processed baseband or IF signal from the TX processing circuit 374 and up-convert the baseband or IF signal into an RF signal transmitted via the antennas 370a-370n.

The controller/processor 378 may include one or more processors or other processing devices that control the overall operation of the gNB 102. For example, the controller/processor 378 can control the reception of forward channel signals and the transmission of backward channel signals through the RF transceivers 372a-372n, the RX processing circuit 376, and the TX processing circuit 374.

The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays. In some embodiments, the controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G, NR, LTE, LTE-A, etc., the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 may include any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using the RF transceivers 372a-372n, the TX processing circuit 374, and/or the RX processing circuit 376) supports aggregated communication with FDD cells and TDD cells.

Various changes may be made to FIG. 3B. For example, the gNB 102 can include any number of each component illustrated in FIG. 3B. For example, the access point can include many backhaul or network interfaces 382, and the controller/processor 378 can support routing functions to route data between different network addresses. Although illustrated as including a single TX processing circuit 374 and a single RX processing circuit 376, the gNB 102 can include multiple TX processing circuits 374 and RX processing circuits 376 (e.g., one for each RF transceiver).

Herein, a time domain unit (or time unit) may be an orthogonal frequency division multiplexing (OFDM) symbol, an OFDM symbol group including multiple OFDM symbols, a time slot, a time slot group including multiple time slots, a sub-frame, a sub-frame group including multiple sub-frames, a system frame, or a system frame group including multiple system frames. A time domain unit may also be an absolute time unit, such as 1 millisecond, 1 second, etc. The time unit may also be a combination of various granularities, such as N1 time slots plus N2 OFDM symbols.

A frequency domain unit (or frequency unit) may be a sub-carrier, a sub-carrier group including multiple sub-carriers, an RB (or physical RB (PRB)), a RB group or set including multiple RBs, a BWP, a BWP group including multiple BWPs, a bandwidth/carrier, or a bandwidth group/carrier group. The frequency domain unit may also be an absolute frequency domain unit, such as 1 Hz, 1 kHz, etc. The frequency domain unit may also be a combination of multiple granularities, such as M1 PRBs plus M2 sub-carriers.

A transmission link of wireless communication system mainly includes downlink communication link from a gNB to a UE, an uplink communication link from a UE to a network, or a bypass link or sidelink between UEs.

Nodes used for positioning measurement in wireless communication systems, such as current wireless communication systems, may include a UE that initiates positioning request message, a location management function (LMF) that is used for UE positioning and sending positioning assistance data, a gNB or transmission-reception point (TRP) that broadcasts positioning assistance data and performs uplink positioning measurement, and a UE that is used for downlink positioning measurement. In addition, the present disclosure may also be extended to other communication systems, such as automobile communication (V2X), i.e., sidelink communication, wherein the transmitting and receiving point or a UE may be any device in V2X.

A method and a device are provided herein for transmitting and/or receiving signals for positioning, so that when a UE receives signals for positioning, the received signals are processed in different time domains and/or frequency domains, so that a UE (e.g., a limited capability UE, such as a reduced capability UE (or RedCap UE)) receives a positioning signal with a large bandwidth. In addition, when the UE transmits a signal for positioning, the UE can transmit a positioning signal with a large bandwidth by processing the signal to be transmitted in different time domains and/or frequency domains.

Alternatively, the UE may refer to a conventional UE, or a UE that only supports a small bandwidth, or it may also refer to any communication device for transmitting positioning signals to a UE or device that only supports a small bandwidth. In some implementations, a UE that only supports a small bandwidth may refer to a UE that can only transmit and/or receive signals within a certain bandwidth range, such as a limited capability UE or a reduced capability UE (e.g., a RedCap UE).

In accordance with an embodiment of the disclosure, a signal transmitting and receiving method and device for positioning is provided. In a wireless communication system, different UEs may have different capabilities. For example, some UEs support a large bandwidth, while others can only support a limited bandwidth. However, a UE with limited capability may not be able to directly measure signals with large bandwidth. Therefore, in accordance with an embodiment of the disclosure, such a UE can perform transmitting and/or receiving or measurement of large-bandwidth signals.

In accordance with an embodiment of the disclosure, a signal for positioning and/or a reference signal for positioning and/or a positioning signal and/or a positioning reference signal have the same meaning and can be used interchangeably, and include one or more of the following combinations:

Synchronization signal/PBCH block (SSB)
Positioning reference signal (PRS)
Channel state information-reference signal (CSI-RS)
Tracking reference signal (TRS)
Sounding reference signal for positioning (SRSpos)
A sounding reference signal (SRS) for MIMO Herein, an SRSpos will be used as an example when a UE transmits a positioning signal, and a PRS will be used as an example when a UE receives a positioning signal.

FIG. 4 is a flowchart illustrating a method according to an embodiment. For example, the method in FIG. 4 may be performed by a UE, wherein a signal transmitted by the UE may be transmitted to a network device or other UE. In addition, the information received by the UE may come from network devices or other UEs. In the following description, for the sake of brevity, the description of the subject that transmits signals to the UE or the subject from which the UE receives signals will be omitted, because it can be understood that these subjects are corresponding devices that communicate with the UE in the process of transmitting and/or receiving positioning signals in appropriate scenarios, which may be network devices or other UEs, such as base stations, TRPs, LMFs, and other UEs that are related to positioning.

Referring to FIG. 4, in step 401, the UE, receives configuration information for a positioning signal, wherein the configuration information includes information related to frequency hopping. In one implementation, the configuration information is indicated by higher layer signaling. As a non-limiting example, there may be multiple sets of configuration information related to frequency hopping configured by high layers, and one or more sets of configuration information may be activated by downlink control information (DCI) for the transmission or reception of current or subsequent positioning signals.

In addition, in another implementation, the configuration information related to frequency hopping may also be indicated by a media access control (MAC) control element (CE) message and/or DCI.

For example, in step 401, the UE may receive, from another UE and/or a network entity, configuration information for a positioning signal.

In step 402, the UE transmits or receives the positioning signal according to the configuration information. In one implementation, step 402 may include the UE determining the positioning signal to be received and/or transmitted according to the configuration information for the received positioning signal, and the UE transmitting and/or receiving the positioning signal accordingly. When the UE receives the positioning signal, the UE can measure the positioning signal to obtain the measurement result.

For example, in step 402, the UE may transmit, to another UE and/or the network entity, the positioning signal based on the configuration information. The UE may receive, from the other UE and/or the network entity, the positioning signal based on the configuration information.

According to an embodiment, the determining the positioning signal to be received and/or transmitted includes at least one of the following:

determining a configuration index of a positioning signal to be received and/or transmitted;
determining an index of a positioning signal to be received and/or transmitted; or determining the time-frequency resources of the positioning signal to be received and/or transmitted, including determining the frequency hopping of the positioning signal to be received and/or transmitted.

Optionally, in step 403, the UE may report the measurement results.

According to the measurement results reported by the UE, the network device or other UEs can perform calculations or processing related to positioning.

Figure 5:
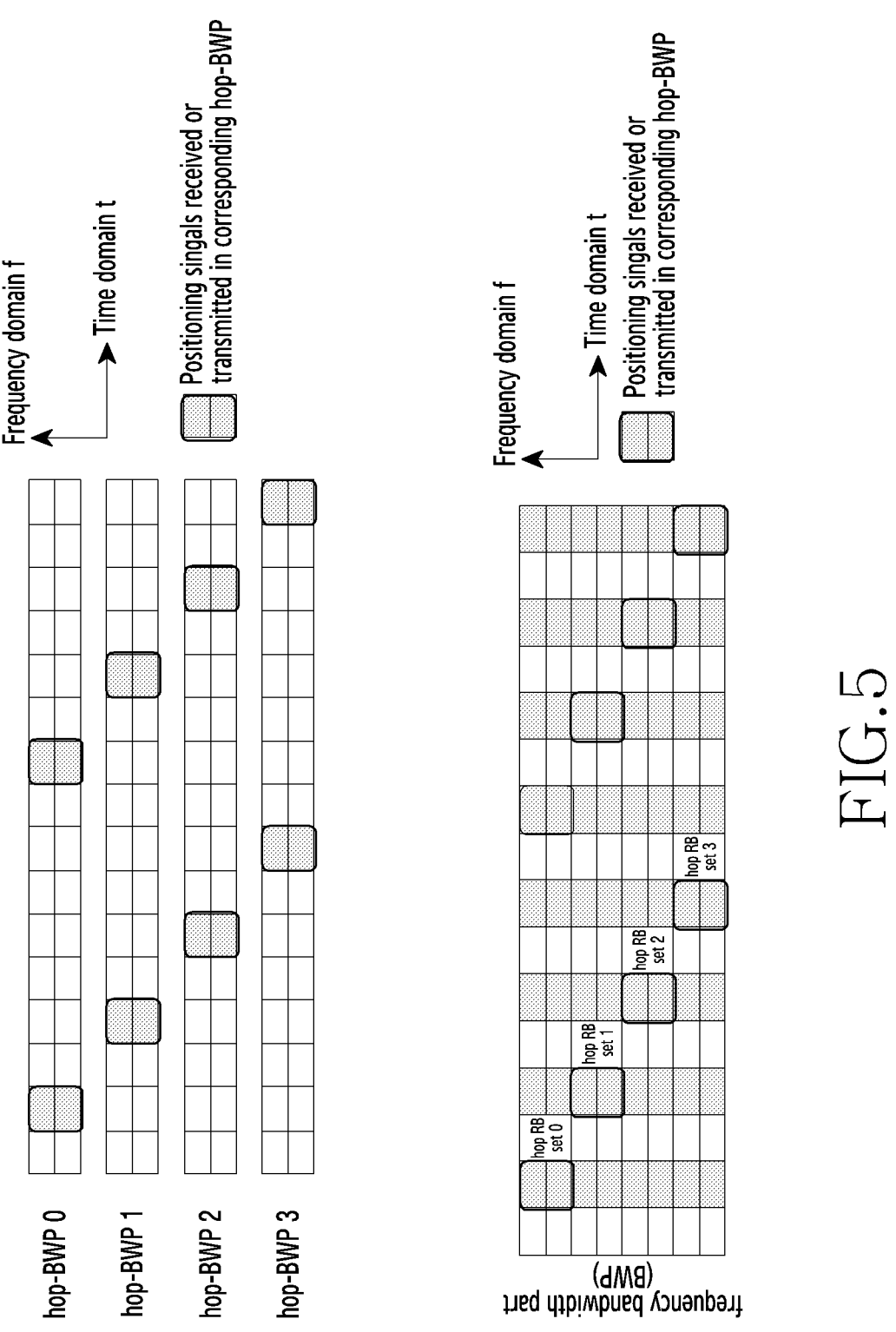
FIG. 5 illustrates a frequency domain location indication for frequency hopping according to an embodiment.

When the UE receives and/or transmits positioning signals according to the requirements of positioning services, the operations performed may include one or more of the following:

receiving configuration information for a positioning signal; the configuration information includes at least one of the following:

a configuration index indicating the configuration information for the positioning signal;
index of the positioning signal; or
time domain configuration information for the positioning signal, including at least one of the following:

a number of time domain units occupied by the positioning signal,
a time interval between the starting position of the time domain unit occupied by the positioning signal and the reference time point, the reference time point may be the sub-frame number (SFN) 0, the starting point of the time domain unit where the positioning signal is located, or the time reference position configured by other nodes (such as network device);
A size of the configuration period, for example, the number of time domain units; the configuration information for the positioning reference signal including the configuration period indicates that one or more positioning signals in each time domain configuration period have the same position and size in time domain and/or frequency domain in each period, i.e., the positioning signals are repeated (there is repetition of positioning signals);
The number of repetitions of the positioning signal, optionally, the number of repetitions is within a certain time period; or
A muting pattern of the positioning signal; the muting pattern indicates that one or more positioning signals are not sent and/or do not need to be received within a certain time period;
The frequency domain configuration information for the positioning signal, including at least one of the following:
The frequency domain starting position of the positioning signal, including the index of the starting frequency domain unit and/or the starting frequency domain unit determined according to the interval of N frequency domain units relative to the frequency domain reference point; optionally, the frequency domain starting position of the positioning signal may also include the frequency domain starting position within a certain frequency domain range;
The number and/or location of frequency domain units occupied by positioning signals; optionally, the number of occupied frequency domain units may also include the number and/or location of frequency domain units occupied within a certain frequency domain range, such as the number and/or location of RE (or sub-carriers) occupied by a PRB; or Information related to frequency hopping of the positioning reference signal, wherein the information may include, for example, one or more of frequency hopping indication information, frequency hopping configuration information and frequency hopping pattern configuration information. The information related to frequency hopping may include at least one of the following:

The indication information of frequency domain location of frequency hopping, including information related to frequency hopping bandwidth part BWP or information related to frequency hopping RB (or PRB), such as frequency hopping bandwidth part index and/or index set (hop-BWP index and/or index set), and/or frequency hopping RB set index hop RB set index and/or index set, or frequency hopping RB Group; e.g., {hop-BWP 0, hop-BWP 1, hop-BWP 2, hop-BWP 3} (as illustrated in FIG. 5) or {hop RB set 0, hop RB set 1, hop RB set 2, hop RB set 3} (as illustrated in FIG. 5); the RB described here may also be replaced by PRB, i.e., the frequency domain location indication information of frequency hopping may also include information related to frequency hopping PRB, such as frequency hopping PRB index set, etc. In addition, FIG. 5 illustrates a plurality of hop RB sets within one BWP, which is only for simplicity of example. Therefore, the plurality of hop RB sets indicated by the frequency domain location indication information of frequency hopping is not limited to one BWP, but may also be within a plurality of BWPs or among a plurality of BWPs.

According to the information related to frequency hopping, the UE may transmit and/or receive positioning signals according to the indicated frequency domain location of frequency hopping in a certain time period; optionally, the UE receives and/or transmits positioning signals in a certain time period according to the indicated frequency domain location of frequency hopping sequentially in time domain.

Alternatively, the frequency hopping RB set index may also be called sub-band index, which corresponds to a plurality of sub-channels divided in one BWP, and each sub-channel occupies no more than the frequency band unit size limited by the UE; optionally, the occupied frequency band unit size of the sub channel is configured by the network device;

the number of frequency hopping; optionally, the number of frequency hopping represents the number of frequency hopping in a certain time period;

time domain gap information of frequency hopping, e.g., time domain gap value of frequency hopping, i.e., the number of time units between two adjacent frequency hopping; optionally, the UE determines the actual adjacent frequency hopping locations according to the configured time domain gap value of frequency hopping, for example, the configured time domain gap between adjacent positioning signals is 2

Figure 6:
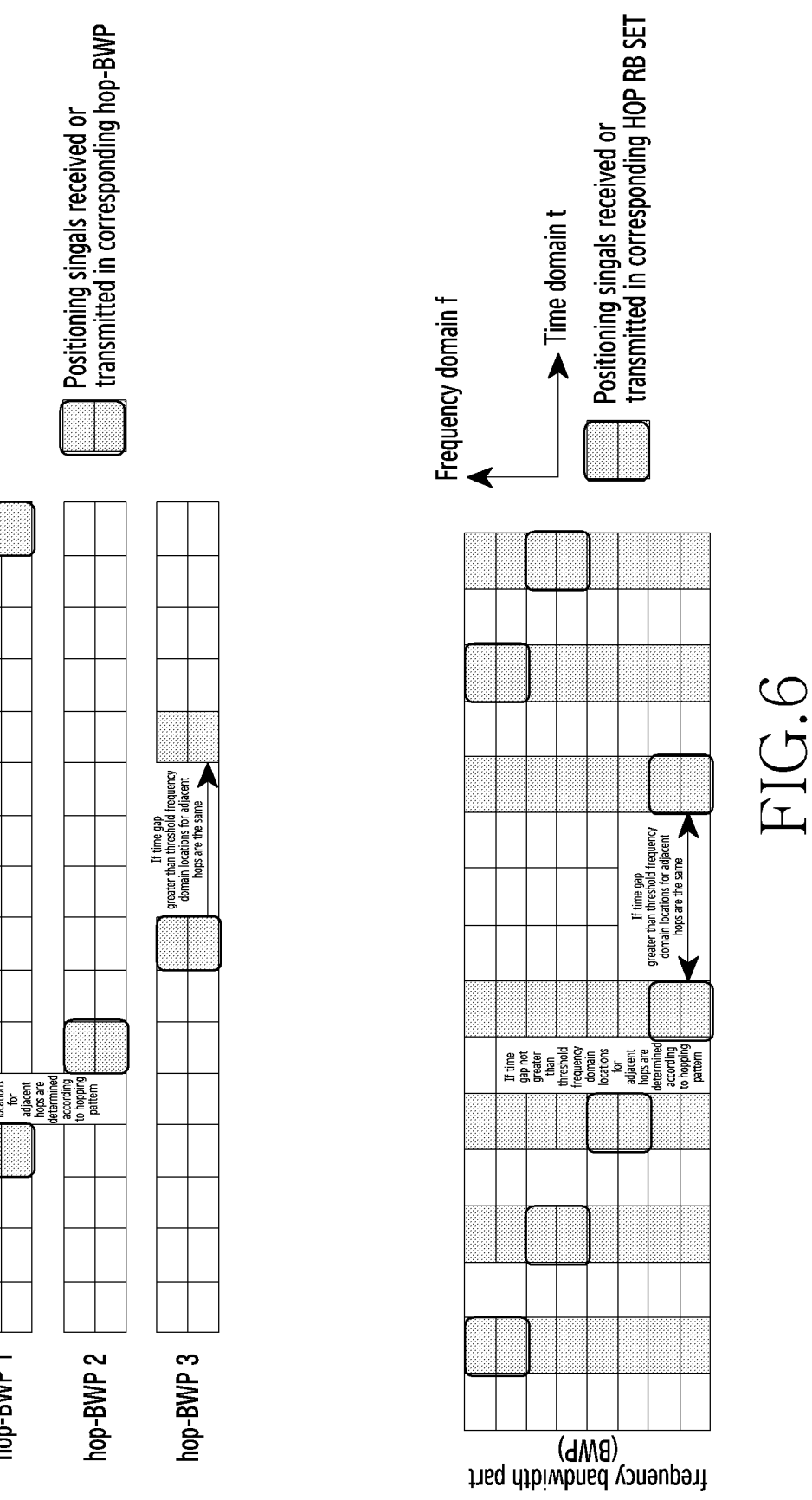
FIG. 6 illustrates a frequency domain location of a frequency hopping indication applying a frequency modulation time domain unit gap according to an embodiment.

OFDM symbols, and each positioning signal occupies 2 OFDM symbols, and the time domain gap value of frequency hopping is 6 symbols, then the first positioning signal corresponds to the first frequency hopping, and the second frequency hopping corresponds to the third positioning signal;

time domain gap threshold of frequency hopping, i.e., X time domain units; the time domain gap threshold of frequency hopping is related to the relationship between frequency domain locations of adjacent frequency hopping. In one implementation, when the number of time domain units of time domain gap between two frequency hopping is greater than (or not less than) X, then the frequency domain location between two frequency hopping can be determined by a first criterion; the first criterion includes that there are Y frequency domain units overlapping between the frequency domain locations of two frequency hopping, and/or that the frequency domain locations of the two frequency hopping are completely the same, i.e., they correspond to the same hop BWP index (as illustrated in FIG. 6) and/or the same hop RB set index (as illustrated in FIG. 6). When the number of time domain units of time domain gap between two frequency hopping is not greater than (or less than) X, then the frequency domain location between two frequency hopping is determined by a second criterion; the second criterion includes that there is no frequency domain unit overlapping between the frequency domain locations of two frequency hopping, and in one implementation, the frequency domain locations of the two frequency hopping are continuous in the frequency domain, i.e., different frequency hopping corresponds to different hop BWP indexes (as illustrated in FIG. 6) and/or different hop RB set indexes (as illustrated in FIG. 6); this method is beneficial to flexibly determine whether the positioning signals on different frequency hopping have changed in phase upon reception and compensate for it.

Frequency hopping type indication, including 1-bit indication, wherein 1 represents frequency hopping within a certain time period, such as intra slot FH, and 0 represents frequency hopping across certain time periods, such as inter slot FH;

According to an embodiment, the frequency domain reference point may be an absolute frequency domain reference point A and/or the frequency domain starting location of a frequency bandwidth part. Optionally, the frequency bandwidth part may be a frequency domain location determined according to the frequency hopping pattern, such as a frequency hopping bandwidth part and/or a frequency hopping RB set;

According to an embodiment, the above-mentioned certain frequency domain range may be one or more frequency domain units, a frequency hopping RB set of the positioning signal, and/or a frequency hopping frequency bandwidth part of the positioning signal. Furthermore, in the above description, "a certain frequency domain range" may refer to the same frequency domain range or different frequency domain ranges.

According to an embodiment, the certain time period may be one or more time units; a configuration period, a measurement period, a measurement gap, a measurement window, and/or a PRS processing window (PPW);

According to an embodiment, the positioning signal may be a positioning signal actually received or actually sent. For example, when the positioning signal collides with the transmission of other signals (e.g., other downlink signals/channels or uplink signals/channels), so that reception and/or transmission cannot be performed, frequency hopping is not performed for the positioning signal, i.e., the frequency hopping of the positioning signal is cancelled.

According to an embodiment, the positioning signal may include one or more of the following: all positioning signals within the above-mentioned certain time period, one, multiple, or all repetition of the all positioning signals, and/or transmission on one frequency hopping of one positioning signal of the all positioning signals.

Determining a positioning signal to be received and/or sent according to the received configuration information for the positioning signal.

The determining the positioning signal to be received includes at least one of the following:

Determining a configuration index of a positioning signal to be received and/or transmitted;

Determining an index of a positioning signal to be received and/or transmitted

Determining time-frequency resources of a positioning signal to be received and/or transmitted, including determining frequency hopping of the positioning signal to be received and/or transmitted;

receiving and/or transmitting positioning signals, including at least one of the following:

The receiving includes the reception and/or measurement of signals, and the result obtained by measurement includes at least one of the following: Time domain related measurement results: time of arrival (TOA) and time difference of arrival (TDOA); and/or angle-related measurement result: azimuth angle of arrival (AOA), zenith angle of arrival (ZOA), angle of arrival (AOA) and angle of departure (AOD); and/or phase-related measurement results: phase of arrival (POA), phase difference of arrival (PDOA), differential phase of arrival (DPOA), etc.

The receiving may include measuring a single frequency hopping to obtain a measurement result, and/or measuring M frequency hopping to obtain a measurement result, wherein M is a positive integer. For example, M may be predefined or obtained through network device configuration, or the value of M can be determined by the number of frequency hopping within the certain period and/or the number of frequency hopping actually received and/or transmitted;

Optionally, when the gap between two adjacent frequency hopping to be transmitted and/or received is less than a second threshold value, the transmission and/or reception of the last one of the two adjacent frequency hopping is cancelled; the second threshold value is predefined and/or configured by the network device.

Reporting the measurement result obtained by receiving the positioning signal. When the UE receives the positioning signal and measures it, the UE can report the measurement result to other devices.

Through the above-described methods, a UE (e.g., a UE that can only transmit or receive signals with a small bandwidth) may transmit or receive signals with a large bandwidth (e.g., a signal with a larger bandwidth than a signal which the UE can normally receive/transmit).

Although a positioning signal is described as an example in the above description, the present disclosure may also be applied to other signals, all of which are included in the scope of this disclosure.

Figure 7:
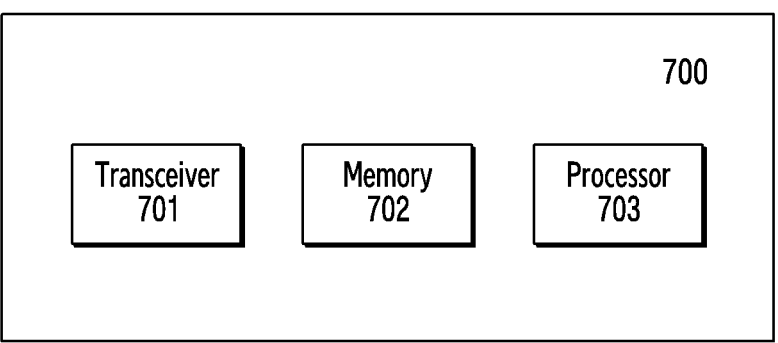
FIG. 7 illustrates a UE according to an embodiment.

FIG. 7 illustrates a UE according to an embodiment.

Referring to FIG. 7, the UE 700 includes a transceiver 701, a memory 702, and a processor 703. The transceiver 701 may transmit and/or receive signals, and computer-executable instructions are stored in the memory. When the instructions are performed by the processor 703, at least one method corresponding to the above embodiments of the present disclosure is executed. The above is only an example embodiment of the invention, and it is not used to limit the invention. Any modification, equivalent substitution, improvement, etc. made within the spirit and principle of the invention should be included in the scope of protection of the invention.

A method performed by a UE is provided. The method includes receiving configuration information for a positioning signal, wherein the configuration information includes at least one of time domain information or frequency domain information related to frequency hopping, and wherein the frequency domain information includes at least one of information related to a frequency hopping bandwidth part BWP and information related to a frequency hopping RB, and transmitting or receiving the positioning signal according to the configuration information.

The information related to frequency hopping includes at least one of information related to frequency domain location of frequency hopping, information on the number of frequency hopping, time domain gap information of frequency hopping, threshold for time domain gap between frequency hopping, or information related to frequency hopping type.

The information related to frequency hopping BWP includes a frequency hopping BWP index or index set, and the information related to the frequency hopping RB includes a frequency hopping RB set index.

The time domain gap information of frequency hopping includes a number of time units between adjacent frequency hopping.

If the number of time domain units between adjacent frequency hopping(s) is not less than the threshold for time domain gap between frequency hopping, then the frequency domain locations of adjacent frequency hopping overlap or are the same.

If the number of time domain units between adjacent frequency hopping is less than the threshold for time domain gap between frequency hopping, then the frequency domain locations of frequency hopping do not overlap.

The frequency hopping type indication information is used to indicate intra time period frequency hopping or inter time period frequency hopping.

The positioning signal includes all positioning signals within a time period, one of the positioning signals, a plurality of positioning signals among the positioning signals, all repetitions of the all positioning signals, or a frequency hopping of one positioning signal among the positioning signals.

The time period includes a time unit, a configuration period, a measurement period, a measurement gap, a measurement window, or a positioning signal processing window.

The UE receives or transmits positioning signals according to the frequency domain information sequentially in time domain.

If the positioning signal conflicts or overlaps with other signal transmissions, the frequency hopping of the positioning signal is cancelled.

The method further comprises measuring the positioning signal, wherein the measurement result is the measurement result of a single frequency hopping, or the measurement results of M frequency hopping, wherein M is configured by a network device or is determined based on the number of frequency hopping actually transmitted or received, or the number of frequency hopping in the time period for the positioning signal.

If the gap between adjacent frequency hopping is less than a second threshold, then the transmission or reception of the positioning signal on latter of the adjacent frequency hopping is cancelled.

A user equipment is provided, which includes a transceiver, and a processor coupled to the transceiver and configured to perform the method above described.

A method performed by a UE in a wireless communication system is provided. The method comprises receiving configuration information for a positioning signal, wherein the configuration information includes at least one of time domain information or frequency domain information related to frequency hopping, and wherein the frequency domain information includes at least one of information related to a frequency hopping BWP or information related to a frequency hopping RB and transmitting the positioning signal based on the configuration information.

The information related to the frequency hopping BWP includes a frequency hopping BWP index or an index set, and the information related to the frequency hopping RB includes a frequency hopping RB set index.

The information related to frequency hopping includes at least one of information related to a frequency domain location of the frequency hopping, information on a number of the frequency hoppings, time domain gap information of the frequency hopping, a threshold for a time domain gap between frequency hoppings, or information related to frequency hopping type.

The time domain gap information of the frequency hopping includes a number of time units between adjacent frequency hoppings.

In case that the number of time domain units between the adjacent frequency hoppings is not less than the threshold for the time domain gap between frequency hoppings, frequency domain locations of the adjacent frequency hoppings overlap, and in case that the number of time domain units between the adjacent frequency hoppings is less than the threshold for the time domain gap between frequency hoppings, the frequency domain locations of the adjacent frequency hoppings do not overlap.

Frequency hopping type indication information is used to indicate an intra time period of the frequency hopping or an inter time period of the frequency hopping.

The positioning signal includes positioning signals within a time period, and the positioning signals are sequentially transmitted based on the frequency domain information in time domain.

The time period includes a time unit, a configuration period, a measurement period, a measurement gap, a measurement window, or a positioning signal processing window, and in case that the positioning signal overlaps with other signals, the frequency hopping of the positioning signal is cancelled.

The method further comprises measuring the positioning signal and identifying a result of measurement. The result of the measurement includes a result of a single frequency hopping, or results of M frequency hopping, and M is configured by a network device or is determined based on at least one of a number of frequency hopping actually transmitted or received, or the number of frequency hoppings in a time period for the positioning signal.

In case that a gap between adjacent frequency hoppings is less than a second threshold, transmission or reception of the positioning signal on a latter of the adjacent frequency hoppings is cancelled.

A UE in a wireless communication system is provided. The UE comprises a transceiver and a controller coupled with the transceiver and configured to receive configuration information for a positioning signal, wherein the configuration information includes at least one of time domain information or frequency domain information related to frequency hopping, and wherein the frequency domain information includes at least one of information related to a frequency hopping BWP or information related to a frequency hopping RB, and transmit the positioning signal based on the configuration information.

The information related to the frequency hopping BWP includes a frequency hopping BWP index or an index set, and the information related to the frequency hopping RB includes a frequency hopping RB set index.

The information related to frequency hopping includes at least one of information related to frequency domain location of the frequency hopping, information on a number of the frequency hopping, time domain gap information of the frequency hopping, a threshold for a time domain gap between frequency hoppings, or information related to frequency hopping type.

The time domain gap information of the frequency hopping includes a number of time units between adjacent frequency hoppings.

In case that a number of time domain units between adjacent frequency hopping is not less than the threshold for the time domain gap between frequency hoppings, frequency domain locations of the adjacent frequency hoppings overlap, and case that the number of time domain units between the adjacent frequency hoppings is less than the threshold for the time domain gap between frequency hoppings, the frequency domain locations of the adjacent frequency hoppings do not overlap.

Frequency hopping type indication information is used to indicate an intra time period of the frequency hopping or an inter time period of the frequency hopping.

The positioning signal comprises at least one of positioning signals within a time period, and the positioning signals are transmitted based on the frequency domain information sequentially in time domain.

The time period includes one of a time unit, a configuration period, a measurement period, a measurement gap, a measurement window, or a positioning signal processing window, and in case that the positioning signal overlaps with other signals, the frequency hopping of the positioning signal is cancelled.

The controller is further configured to measure the positioning signal, and identify a result of measurement, wherein the result of the measurement includes a result of a single frequency hopping or results of M frequency hopping, and wherein M is configured by a network device or is determined based on at least one of a number of frequency hoppings actually transmitted or received or a number of frequency hoppings in a time period for the positioning signal.

In case that a gap between adjacent frequency hoppings is less than a second threshold, transmission or reception of the positioning signal on a latter of the adjacent frequency hoppings is cancelled.

Those skilled in that art will understand that the present invention includes a device for performing one or more of the operations described in this application. These devices may be specially designed and manufactured for required purposes, or they may also include known devices in general-purpose computers. These devices have computer programs stored therein, which are selectively activated or reconfigured. Such a computer program may be stored in a device (e.g., a computer) readable medium or stored in any type of media that are suitable for storing electronic instructions and respectively coupled to a bus. The computer readable media includes but not limited to any type of disk (including a floppy disk, a hard disk, an optical disk, a compact disc (CD)-ROM, and a magneto-optical disk), ROM, RAM, erasable programmable ROM (EPROM), electrically EPROM (EEPROM), flash memory, a magnetic card, or an optical card. That is, a readable medium includes any medium in which information is stored or transmitted by a device (e.g., a computer) in a readable form.

Each block in these structural diagrams and/or block diagrams and/or flow diagrams and combinations of blocks in these structural diagrams and/or block diagrams and/or flow diagrams can be implemented by computer program instructions. Computer program instructions can be provided to a general-purpose computer, a professional computer or a processor of other programmable data processing methods for implementation, so that the scheme specified in the block or blocks of the structure diagram and/or block diagram and/or flow diagram herein can be performed by the processor of the computer or other programmable data processing methods.

The steps, measures and schemes in various operations, methods and processes discussed above may be alternated, modified, combined or deleted. Further, other steps, measures and schemes in the various operations, methods and processes already discussed above may also be alternated, changed, rearranged, decomposed, combined or deleted. Further, the same steps, measures and schemes in various operations, methods and flows in the prior art as disclosed above may also be alternated, changed, rearranged, decomposed, combined or deleted.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a reduced capability (RedCap) user equipment (UE) in a wireless communication system, the method comprising:

receiving, from a location management function (LMF) entity for positioning of a device including the RedCap UE, a first message for a positioning measurement, wherein the first message includes first information indicating to use frequency hopping for a downlink (DL) positioning reference signal (PRS), second information on a duration of a time window for the positioning measurement, and third information on a time offset of the time window for indicating a start of the time window;

performing the positioning measurement using the DL PRS in the time window based on the first information; and transmitting, to the LMF entity for the positioning of the device, a second message as a response to the first message, wherein the second message includes a result of the positioning measurement and information indicating whether the positioning measurement is based on the frequency hopping with a single hop or multiple hops, and wherein, in case that the positioning measurement is based on the frequency hopping with the multiple hops, all of the multiple hops are received during a single measurement gap configured for the RedCap UE.

2. The method of claim 1, wherein the LMF entity for positioning of the device is different from a base station associated with the positioning, and wherein a bandwidth of all of the multiple hops is greater than a maximum bandwidth of the RedCap UE.

3. The method of claim 1, further comprising transmitting, to a base station, a sounding reference signal (SRS) within a time window based on information on a hop bandwidth, information on a number of overlapping resource blocks between hops, and information on a number of hops.

4. The method of claim 3, wherein the RedCap UE is configured with the information on the hop bandwidth, the information on the number of the overlapping resource blocks, and the information on the number of the hops.

5. The method of claim 1, wherein the positioning measurement is associated with a time difference of arrival (TDOA) positioning.

6. A reduced capability (RedCap) user equipment (UE) in a wireless communication system, the RedCap UE comprising:

a transceiver; and a controller coupled with the transceiver and configured to:

receive, from a location management function (LMF) entity for positioning of a device including the RedCap UE, a first message for a positioning measurement, wherein the first message includes first information indicating to use frequency hopping for a downlink (DL) positioning reference signal (PRS), second information on a duration of a time window for the positioning measurement, and third information on a time offset of the time window for indicating a start of the time window, perform the positioning measurement using the DL PRS in the time window based on the first information, and transmit, to the LMF entity for the positioning of the device, a second message as a response to the first message, wherein the second message includes a result of the positioning measurement and information indicating whether the positioning measurement is based on the frequency hopping with a single hop or multiple hops, and wherein, in case that the positioning measurement is based on the frequency hopping with the multiple hops, all of the multiple hops are received during a single measurement gap configured for the RedCap UE.

7. The RedCap UE of claim 6, wherein the LMF entity for the positioning of the device is different from a base station associated with the positioning, and wherein a bandwidth of all of the multiple hops is greater than a maximum bandwidth of the RedCap UE.

8. The RedCap UE of claim 6, wherein the controller is further configured to transmit, to a base station, a sounding reference signal (SRS) within a time window based on information on a hop bandwidth, information on a number of overlapping resource blocks between hops, and information on a number of hops.

9. The RedCap UE of claim 8, wherein the RedCap UE is configured with the information on the hop bandwidth, the information on the number of the overlapping resource blocks, and the information on the number of the hops.

10. The RedCap UE of claim 6, wherein the positioning measurement is associated with a time difference of arrival (TDOA) positioning.

11. A method performed by a location management function (LMF) entity in a wireless communication system, the method comprising:

transmitting, to a reduced capability (RedCap) user equipment (UE), a first message for a positioning measurement, wherein the first message includes first information indicating frequency hopping for a downlink (DL) positioning reference signal (PRS), second information on a duration of a time window for the positioning measurement, and third information on a time offset of the time window for indicating a start of the time window, and wherein the positioning measurement using the DL PRS in the time window is based on the first information; and receiving, from the RedCap UE, a second message as a response to the first message, wherein the LMF entity is for positioning of a device including the RedCap UE, wherein the second message includes a result of the positioning measurement and information indicating whether the positioning measurement is based on the frequency hopping with a single hop or multiple hops, and wherein, in case that the positioning measurement is based on the frequency hopping with the multiple hops, all of the multiple hops are associated with a single measurement gap for the RedCap UE.

12. The method of claim 11, wherein the LMF entity for the positioning of the device is different from a base station associated with the positioning, and wherein a bandwidth of all of the multiple hops is greater than a maximum bandwidth of the RedCap UE.

13. The method of claim 11, wherein the RedCap UE is configured with information on a hop bandwidth, information on a number of overlapping resource blocks between hops, and information on a number of hops.

14. The method of claim 13, wherein the information on the hop bandwidth, the information on the number of the overlapping resource blocks, and the information on the number of the hops are associated with a sounding reference signal (SRS).

15. The method of claim 11, wherein the positioning measurement is associated with a time difference of arrival (TDOA) positioning.

16. A location management function (LMF) entity in a wireless communication system, the LMF entity comprising:

a transceiver; and a controller coupled with the transceiver and configured to:

transmit, to a reduced capability (RedCap) user equipment (UE), a first message for a positioning measurement, wherein the first message includes first information indicating frequency hopping for a downlink (DL) positioning reference signal (PRS), second information on a duration of a time window for the positioning measurement, and third information on a time offset of the time window for indicating a start of the time window, and wherein the positioning measurement using the DL PRS in the time window is based on the first information, and receive, from the RedCap UE, a second message as a response to the first message, wherein the LMF entity is for positioning of a device including the RedCap UE, wherein the second message includes a result of the positioning measurement and information indicating whether the positioning measurement is based on the frequency hopping with a single hop or multiple hops, and wherein, in case that the positioning measurement is based on the frequency hopping with the multiple hops, all of the multiple hops are associated with a single measurement gap for the RedCap UE.

17. The LMF entity of claim 16, wherein the LMF entity for the positioning of the device is different from a base station associated with the positioning, and wherein a bandwidth of all of the multiple hops is greater than a maximum bandwidth of the RedCap UE.

18. The LMF entity of claim 16, wherein the RedCap UE is configured with information on a hop bandwidth, information on a number of overlapping resource blocks between hops, and information on a number of hops.

19. The LMF entity of claim 18, wherein the information on the hop bandwidth, the information on the number of the overlapping resource blocks, and the information on the number of the hops are associated with a sounding reference signal (SRS).

20. The LMF entity of claim 16, wherein the positioning measurement is associated with a time difference of arrival (TDOA) positioning.

* * * * *